United States Patent Office 3,738,946
Patented June 12, 1973

3,738,946
CONVERSION OF SCRAP POLYURETHANE FOAM TO POLYOL
Floro F. Frulla, Wallingford, Alec Odinak, New Haven, and Adnan A. R. Sayigh, North Haven, Conn., assignors to The Upjohn Company, Kalamazoo, Mich.
No Drawing. Filed Aug. 5, 1971, Ser. No. 169,468
Int. Cl. C08f 37/24; C08g 53/22
U.S. Cl. 260—2.3                                  8 Claims

ABSTRACT OF THE DISCLOSURE

A process is disclosed for converting scrap polyurethane into a polyol which is re-usable without the need for purification in the preparation of polyurethane foam. The process comprises heating the scrap at about 175° C. to about 250° C. (preferably at 185 to 225° C.) in the presence of a dihydroxy compound consisting of (i) from 100 percent to 90 percent by weight of an aliphatic diol having from 2 to 6 carbon atoms, inclusive, and having a boiling point above about 180° C. and (ii) from 0 percent to 10 percent by weight of a dialkanolamine having from 4 to 8 carbon atoms, inclusive. The process is particularly advantageous in the recovery of useful polyols from scrap rigid polyurethane foams derived from a polymethylene polyphenyl polyisocyanate and a polyol obtained by reaction of propylene oxide with a mixture of polymethylene polyphenyl polyamines produced by acid condensation of aniline and formaldehyde.

BACKGROUND OF THE INVENTION (1) Field of the invention

This invention relates to the conversion of scrap polyurethanes to useful polyols and is more particularly concerned with a process for the conversion of scrap cellular polyurethane to polyols which are re-usable in the preparation of cellular polyurethanes.

(2) Description of the prior art

One of the side effects of the startling growth of the polyurethane industry in recent years has been the creation of a problem of considerable magnitude, namely, that of disposing of the waste material generated in the production of polyurethanes. This is particularly true in respect of the production of polyurethane foam in continuous bunstock form. The bunstock is generally cut into desired configurations and the cutting operation gives rise to significant quantities of foam trim, as well as foam dust, which cannot be used and have to be scrapped. This not only represents an economic loss but also poses an environmental pollution problem of mounting proportions because the foam density is very low and the disposal of the scrap is generally carried out in a land-fill type operation, hence the spatial volume to weight requirements are accordingly enormous.

Several methods of tackling the problem have been described in the literature. These methods include incorporating the scrap, in comminuted form, as a filler in subsequently produced polyurethane foams. However, the amount of scrap which can be utilized in this manner is limited and the properties of the resulting foams are generally affected deleteriously. Other methods of recovery have employed the use of adhesives to bind chopped flexible foam scrap into sheets or like articles. Such conglomerates are of limited use.

Methods have also been described of reconverting scrap polyurethane to polyols and like materials which are useful as starting materials for the preparation of other polyurethanes. However, no commercially economical method of accomplishing this result has so far been described. For example, U.S. 2,937,151 discloses heating scrap foam, in the presence of the polyol used to prepare the original foam, to give a product which can be blended with additional polyol and used as the polyol component in the preparation of new foams. The method requires the use of the relatively expensive starting polyol both in the recovery process and in the blending procedure after the recovery process. Further, the ratio of scrap material to starting polyol is low and the preferred method requires use of vacuum equipment to prevent discoloration of the product during the heating process.

U.S. 2,998,395 describes combustion of the polyurethane under controlled conditions to recover polyester polyol as the residue. The other components of the scrap material are lost as combustion products. U.S. 3,109,824 describes heating scrap polyurethane with a liquid carboxylic acid such as tall oil. The resulting product contains free carboxylic acid groups and is of very limited use as a polyol component for the preparation of further polyurethanes.

U.S. 3,117,940 employs the reaction of scrap polyurethane with a primary amine to produce a liquid product which can be used to prepare further polyurethanes. However, the resulting product contains a high proportion of amino groups which give rise to urea linkages in reaction with a polyisocyanate. The formation of urea linkages is generally undesirable in high quality rigid polyurethane foams. Separation of the amine from the recovered polyol prior to reaction with polyisocyanate would be possible but would be fatal to the economics of the process.

U.S. 3,143,515 discloses a process of thermally decomposing a polyurethane foam derived from polyester by pressing between heated plates and recovering polyester as a liquid residue. U.S. 3,300,417 discloses a process closely related to that of U.S. 2,937,151, supra. The scrap foam is heated with the same polyol as that used to prepare the foam; the heating is carried out in the presence of a catalyst.

U.S. 3,404,103 discloses converting a polyether-based foam to a mixture of the starting polyether and the diamine or polyamine corresponding to the polyisocyanate used to prepare the foam. The reaction is carried out by heating the scrap foam with an amine (e.g. monoethanolamine) in the presence of a base. The product separates into two layers one of which is polyol and the other polyamine. The latter requires to be separated and converted to isocyanate or used as curing agent. Japanese publication 10,634/67 shows the same process without the use of the base catalyst.

U.S. 3,441,616 teaches hydrolyzing a polyether based polyurethane to recover the polyether. The hydrolysis is conducted in the presence of an aqueous strong base and dimethylsulfoxide. The polyether so produced requires to be extracted from the product. The remainder of the reaction product is apparently not useful.

We have now found that scrap polyurethane can be converted in its entirety to an active hydrogen containing material which is useful per se without any further treatment and without necessarily blending with other polyols, in the preparation of new polyurethane foams. The process is commercially economical and feasible and represents a simple, elegant method of recovering waste polyurethanes for re-use.

SUMMARY OF THE INVENTION

This invention comprises a process for the recovery of scrap polyurethane in the form of a polyol which process comprises thermally treating said scrap polyurethane at a temperature of about 175° C. to about 250° C. in the presence of a dihydroxy compound consisting of (i) from 100 percent to 90 percent by weight of an aliphatic diol having from 2 to 6 carbon atoms, inclusive, and having a boiling point above about 180° C. and (ii) from 0 percent to 10 percent by weight of a dialkanolamine having from 4 to 8 carbon atoms, inclusive.

The term "aliphatic diol having from 2 to 6 carbon atoms, inclusive" means a diol of the formula

HO—A—OH wherein A is alkylene having the stated carbon atom content or alkylene interrupted in the chain thereof by an oxygen atom provided that the overall carbon atom content of the group is still within the stated limit.

The aliphatic diols employed in the process of the invention are those falling within the above definition which have the additional limitation that the boiling point thereof at atmospheric pressure (760 mm. of mercury) be above about 180° C. Illustrative of aliphatic diols having the above characteristics are ethylene glycol, 1,4-butanediol, 1,5-pentanediol, diethylene glycol, dipropylene glycol and the like.

The term "dialkanolamine having from 4 to 8 carbon atoms, inclusive" is inclusive of diethanolamine, diisopropanolamine, N-(2-hydroxypropyl)ethanolamine, dipropanolamine, 3,3'-iminobis(2-hydroxybutane) and the like.

DETAILED DESCRIPTION OF THE INVENTION

The process of the invention can be employed in the recovery of any polyurethane, cellular or non-cellular, whether the latter is based on a polyether polyol, polyester polyol or combination thereof. The polyurethane, when treated in accordance with the invention, is converted substantially completely to an active hydrogen containing material which can be used, without further treatment, as the polyol component in the synthesis of further polyurethanes.

In carrying out the process of the invention, the scrap polyurethane is advantageously chopped or ground to particles of relatively small size in order to reduce the volume of the scrap and to assist in reducing the time necessary for the reaction to take place. When the amount of scrap polyurethane is low compared with the amount of aliphatic diol to be used, the scrap, after pretreatment to reduce the particle size, can be admixed with the aliphatic diol at ambient temperature and then the mixture can be heated to a temperature within the above defined range. However, it is preferred, particularly when the proportion of scrap foam to diol is above about 1:5 in parts by weight, that the aliphatic diol be preheated to a temperature within the range defined above, and the scrap polyurethane added to the heated diol. The addition of the scrap polyurethane can be carried out in a single batch or preferably can be carried out portionwise over a period of time.

Once the mixture of scrap polyurethane and aliphatic diol has been brought to a temperature within the above-defined range said mixture is maintained at a temperature within said range at least until all the scrap has dissolved and an homogeneous solution is obtained. The end point of the reaction can be detected by routine techniques, for example, by observing the rate of change of viscosity. In general the period of heating necessary to recover the scrap foam as polyol will range from about 3 hours to about 15 hours depending upon the nature of the scrap polyurethane and the diol employed. The most desirable reaction time for any particular combination of polyurethane and diol can be determined by a process of trial and error.

When the reaction is completed, as determined by viscosity determination, infrared spectral analysis or like techniques, the reaction mixture is cooled, or allowed to cool, to room temperature. The product so obtained is ready, without any further treatment, for use as the polyol component in the preparation of new polyurethanes.

The process of the invention is especially valuable in the recovery of useful polyols from rigid polyurethane foam scrap. Rigid polyurethane foams are generally prepared from polyols having relatively low molecular weight and the products obtained by subjecting such foams to the process of the invention are homogeneous liquids which can be used, without any further treatment, as the polyol component in the preparation of further polyurethanes. The process can also be used, if desired, in the recovery of useful polyols from scrap flexible polyethane foams. The latter are generally prepared from polyols having much higher molecular weight than those used to prepare rigid foams. The products generated from flexible foam in the process of the invention are generally incompatible with each other. The two layers can, if desired, be separated. Since each layer is substantially completely polyol, the two layers can be used independently as starting polyols for the preparation of new polyurethanes. Alternatively, when the reaction product from the process of the invention separates into two layers, the latter need not be separated but can be homogenized immediately before use and used as such in the preparation of new polyurethanes.

In the case of the recovery of scrap foams which are derived from phosphorus containing polyols based on phosphoric acid, it is found that the polyol recovered in accordance with the process of the invention may contain significant amounts of acid-reacting material. This generally does not affect the usefulness of the polyol in the preparation of polyurethanes therefrom. However, whenever such recovered polyols are to be used in a process in which a low acid number is desirable in the polyol, and the acid number of the recovered polyol is above the desirable limit, said recovered polyol can be treated by procedures known in the art to reduce the acid number. One of the most convenient ways of doing this is to react the recovered polyol with sufficient of an alkylene oxide such as ethylene oxide, propylene oxide and the like to react with all the acid hydroxyls in the recovered polyol. The polyol treated in this way is then eminently suitable for use in situations in which a low acid number is desirable.

When the products of the process of the invention are used in the preparation of new polyurethanes, they can be used as the sole polyol of the reaction mixture required to make the new polyurethane or, alternatively, they can be blended with other polyols conventionally used in the preparation of polyurethanes. The methods and reactants employed to prepare polyurethanes, both cellular and non-cellular, are so well-known in the art that they need not be discussed herein.

The viscosity of the reaction product obtained in accordance with the process of the invention is largely governed by the particular diol and scrap polyurethane used and by the proportions in which they are used. Advantageously, the viscosity of the reaction product should be within the range of about 5,000 cps. to about 50,000 cps. measured at 25° C. in order to be particularly suited for use in the preparation of polyurethane foams. A viscosity in this range can be readily attained in the case of any particular diol and scrap polyurethane by a process of trial and error. Thus, in the case of diethylene glycol as the aliphatic diol and a rigid polyether-based polyurethane foam as the scrap, viscosities in the above range are readily obtained by using approximately equal parts by weight of diethylene glycol and scrap foam.

The proportion of scrap polyurethane to aliphatic diol can be varied over a wide range depending upon the viscosity of the reaction product which is ultimately desired. The upper limit of amount of scrap will vary according to the nature of the scrap and the diol. In general, amounts up to about 1 part by weight of scrap per 1 part by weight of diol can be employed readily. Amounts of scrap in excess of the above proportion can be employed but tend to make the viscosity of the ultimate product unduly high.

The aliphatic diol employed in the process of the invention can be used alone or, in a preferred embodiment of process of the invention, is employed in combination with a minor amount of a dialkanolamine as hereinbefore defined. The amount of dialkanolamine so employed is advantageously not more than 10 percent by weight based on diol. Preferably, the amount of dialkanolamine employed is approximately 5 percent by weight based on diol. The presence of the small amount of dialkanolamine in the reaction mixture employed in the process of the invention serves to increase the rate at which reaction occurs. The use of amounts of dialkanolamine in excess of about 10 percent by weight based on diol gives highly undesirable results. Further, dialkanolamines have the disadvantage that, in the breakdown of the scrap polyurethanes, they give rise to the formation of a polyamine corresponding to the original polyisocyanate employed in making the polyurethanes. The polyamine so produced will react with polyisocyanate to form urea linkages which, particularly in the case of rigid foams, are deleterious as far as physical properties of the polyurethane are concerned.

In contrast, the reaction of the aliphatic diol with scrap polyurethane in accordance with process of the invention gives rise to breakdown products which contain hydroxyl groups but not free amino groups. The reaction of the diol with the scrap polyurethane can be illustrated schematically as follows:

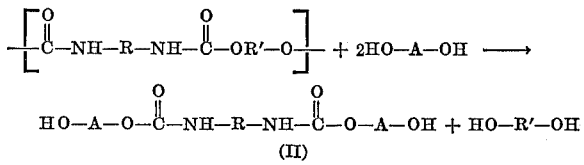

wherein R is the residue of the polyisocyanate [a diisocyanate R(NCO)₂ is shown for purposes of simplicity] employed in the preparation of the original polyurethane, R' is the residue of the polyol [a diol R' (OH)₂ is shown for purposes of simplicity] employed in the preparation of the original polyurethane, and HO—A—OH is the aliphatic diol as hereinbefore defined. It will be seen from the above, highly simplified, reaction scheme that the scrap polyurethane is broken down by ester interchange, in accordance with process of the invention, with the formation of (a) the original polyol from which the polyurethane was produced and (b) a polyol corresponding to the reaction product (II) obtained from the original polyisocyanate and the diol HO—A—OH.

It is to be understood that the above reaction scheme is offered by way of explanation only and is not intended in any way to limit the scope of this invention.

While any of the aliphatic diols falling within the definition set forth above can be used, alone or in combination with a dialkanolamine, in the process of the invention, it is prefered to use diethylene glycol as the aliphatic diol in accordance with the process of the invention. In a particularly preferred embodiment of the process of the invention, a combination of diethylene glycol and approximately 5 percent by weight of diethanolamine has been found to be especially useful in carrying out the recovery of scrap polyurethane.

The process of the invention can, as stated before, be used in the recovery of any scrap polyurethane, both cellular and non-cellular, whatever the nature of the polyol employed in the preparation of the scrap. Preferably, the process of the invention is employed in the recovery of scrap rigid polyurethane foam derived from polyol components having an equivalent weight less than about 175. The reaction products obtained from such scraps are homogeneous whereas the products obtained from scrap derived from higher molecular weight polyols tend to separate into two layers.

It has been found that the process of the invention is particularly useful in the recovery of polyols from scrap rigid polyurethane foam which has been derived from polyols obtained by the alkoxylation of polyamines. Illustrative of the latter type of polyurethane foams are those described in U.S. Pat. 3,423,344. The reaction product obtained by applying the process of the invention to this type of rigid polyurethane foam is particularly valuable as a polyol component in the preparation of new rigid polyurethane foams of exceptionally high quality.

The following examples describe the manner and process of making and using the invention and set forth the best mode contemplated by the inventors of carrying out the invention but are not to be construed as limiting.

EXAMPLE 1

The scrap foam employed as the starting material in the process described in this example was scrap obtained from a rigid polyurethane foam which had been prepared in the following manner:

A blend of the following components was made by mechanical mixing:

(1) A blend of the following polyols:
  60 parts by weight of a blend (eq. wt.=151) of (i) a polyol obtained by propoxylating a polymethylene polyphenyl polyamine containing approximately 50 percent by weight of methylenedianiline and (ii) a polyol of eq. wt.=89 obtained by propoxylating glycerol
  30 parts by weight of an adduct of phosphoric acid and propylene oxide having an equivalent weight of 148
  10 parts by weight of trimethylolpropane
(2) 2 parts by weight of organosilicone surfactant (L–5410)
(3) 0.4 part by weight of water
(4) 0.6 part by weight of tetramethyl guanidine
(5) 0.4 part by weight of N,N,N',N'-tetramethylbutanediamine
(6) 33 parts by weight of trichlorofluoromethane To the above mixture was added 140 parts by weight of polymethylene polyphenyl polyisocyanate of equivalent weight 134 and the resulting mixture was subjected to high speed mechanical stirring for 10 seconds and then was allowed to foam freely. The resulting foam after curing at 25° C. for 7 days, had a density of 2.03 p.c.f. and compressive strength of 48.5 p.s.i. parallel to rise and 17.3 p.s.i. perpendicular to rise.

In carrying out the recovery process according to the invention, a total of 5760 g. of diethylene glycol was charged to a 18 l. stirred reactor equipped with thermometer, condenser, opening for addition of solids, and a heating mantle. The diethylene glycol was heated to 210° C. and maintained thereat with stirring while 300 g. portions of finely ground foam (scrap obtained from the above described foam) was added at intervals over a period of 12 hours until a total of 5760 g. of scrap foam had been added. Each addition of foam scrap was made after the mixture resulting from the previous addition had become homogeneous. After the addition of scrap foam was complete, the reaction mixture was maintained at approximately 210° C. with stirring for a further 5 hours. The resulting product had a viscosity of 20,100 cps. at 25° C., a hydroxyl equivalent weight of 98.5, and an acid number of 18.

A foam was prepared using exactly the procedure described at the beginning of this example but using as the polyol component 0.89 equivalents of a blend of 40 parts by weight of the above described recovered polyol and 60 parts by weight of the polyol blend (1) used to prepare the original foam. It was found that the resulting foam, after curing at 25° C. for 7 days, had a density of 2.0 p.c.f. and a compressive strength of 40.9 p.s.i. parallel to the rise and 13.3 p.s.i. perpendicular to rise.

EXAMPLE 2

A charge of 400 g. of dipropylene glycol was placed in a 2 liter flask equipped with agitator, thermometer, reflux condenser, means for addition of solids, and heating bath.

The dipropylene glycol was heated to 196° C. with stirring and a total of 400 g. of finely powdered scrap foam (derived from the foam prepared as described at the beginning of Example 1) was added portionwise over a 5½ hour period. The temperature was maintained at 200 to 210° C. throughout this period. After the addition was complete the reaction mixture was heated at the same temperature for a further 1½ hour. The resulting product was allowed to cool to room temperature (circa 25° C.). There was thus obtained a liquid homogeneous material which was found to have a hydroxyl equivalent weight of 120, an acid number of 12 and a viscosity of 95,500 cps. at 25° C.

A foam was prepared using exactly the procedure and ingredients set forth at the beginning of Example 1 but using as the polyol component 0.89 equivalents of a blend of 40 parts by weight of the above-described recovered polyol and 60 parts by weight of the polyol blend (1) used to prepare the original foam of Example 1. It was found that the resulting foam was of excellent appearance and, after curing at 25° C. for 7 days, had a density of 1.95 p.c.f. and a compressive strength of 25.5 p.s.i. parallel to rise and 20.5 p.s.i. perpendicular to rise.

EXAMPLE 3

A charge of 400 g. of 1,5-pentanediol in the same equipment as that used in Example 2 was heated to 210° C. and maintained in the range of 200 to 215° C. with stirring while a total of 400 g. of finely powdered scrap foam (derived from the foam prepared as described at the beginning of Example 1) was added portionwise over a period of 5 hours. After the addition was complete, the reaction mixture was heated with stirring for another 1½ hours at the same temperature. The resulting product was allowed to cool to room temperature (circa 25° C.) to yield a liquid material having an hydroxyl equivalent weight of 107.5, a viscosity of 30,900 cps. at 25° C. and an acid number of 17.

A foam was prepared using exactly the procedure and ingredients set forth at the beginning of Example 1, but using as the polyol component 0.89 equivalents of a blend of 40 parts by weight of the above-described recovered polyol and 60 parts by weight of the polyol blend (1) used to prepare the original foam of Example 1. It was found that the resulting foam had excellent appearance, a density of 2.01 p.c.f. and a compressive strength of 25.8 p.s.i. parallel to rise and 11.4 p.s.i. perpendicular to rise.

EXAMPLE 4

Using the same equipment as described in Example 2, a charge of 400 g. of ethylene glycol was heated to 185° C. and maintained thereat (range 185° C. to 195° C.) with stirring while a total of 400 g. of finely divided scrap foam, derived from the foam prepared as described at the beginning of Example 1) was added portionwise over a period of 6 hours. At the end of this period the homogeneous mixture was allowed to cool to room temperature (circa 25° C.). There was thus obtained a recovered polyol having a hydroxyl equivalent weight of 70, an acid number of 13, and a viscosity of 115,800 cps. at 25° C.

A polyurethane foam was prepared from the recovered polyol as follows:

A blend of the following components was prepared by mechanical mixing:

(1) A blend of the following polyols:
 20 parts by weight of the recovered polyol described above;
 64.3 parts by weight of a blend (eq. wt.=151) of (i) a polyol obtained by propoxylating a polymethylene polyphenyl polyamine containing approximately 50 percent by weight of methylenedianiline and (ii) a polyol of eq. wt.=89 obtained by propoxylating glycerol; and 15.7 parts by weight of an adduct of phosphoric acid and propylene oxide having an equivalent weight of 148

(2) 2 parts by weight of organosilicone surfactant (L-5410)
(3) 0.4 part by weight of water
(4) 0.9 part by weight of tetramethyl guanidine
(5) 0.6 part by weight of N,N,N',N'-tetramethylbutanediamine
(6) 33 parts by weight of trichlorofluoromethane.

To the above blend was added 140 parts by weight of polymethylene polyphenyl polyisocyanate of equivalent weight 134 and the resulting mixture was subjected to high speed mechanical stirring for 10 seconds and then was allowed to foam freely. The resulting foam, after curing at 25° C. for 7 days, had a density of 2.0 p.c.f. and a compressive strength of 45.6 p.s.i. parallel to rise and 10.9 p.s.i. perpendicular to rise.

EXAMPLE 5

A mixture of 380 g. of diethylene glycol and 20 g. of diethanolamine was charged to the equipment described in Example 2 and heated to 205° C. To the hot mixture was added portionwise with stirring a total of 400 g. of scrap foam (derived from the foam prepared as described at the beginning of Example 1). The reaction temperature was maintained at 205 to 225° C. throughout the addition which took approximately 5 hours. When the addition was complete the mixture was heated in the same temperature range with stirring until a homogeneous solution was obtained and was then allowed to cool to room temperature (circa 25° C.). There was thus obtained a recovered polyol having an hydroxyl equivalent weight of 97.5, an acid number of 17, and a viscosity of 10,800 cps. at 25° C.

A rigid polyurethane foam was made from this recovered polyol using the procedure and ingredients set forth at the beginning of Example 1 but using as the polyol component 0.89 equivalent of a blend of 40 parts by weight of the above-described recovered polyol and 60 parts by weight of the polyol blend (1) used to prepare the original foam in Example 1. The resulting rigid foam had excellent appearance, a density of 1.84 p.c.f., and a compressive strength of 32.1 p.s.i. parallel to rise and 11.3 p.s.i. perpendicular to rise.

EXAMPLE 6

This example illustrates the inferior results obtained using diethanolamine alone to convert scrap polyurethane foam to a polyol.

A charge of 246.5 g. of diethanolamine was heated to 195° C. in the apparatus described in Example 2. To the hot amine was added, portionwise with stirring, a total of 246.5 g. of finely ground scrap polyurethane foam (derived from the foam prepared as described at the beginning of Example 1). The reaction temperature was maintained at 200 to 215° C. during the addition which took a total of 3 hours. The resulting mixture was heated for a further 1 hour at this temperature and then allowed to cool to room temperature (circa 25° C.). There was thus obtained a recovered polyol product having an hydroxyl equivalent weight of 80.5 and a viscosity of 49,700 cps. at 25° C. This product was basic to litmus.

A rigid polyurethane foam was prepared from this recovered product using the procedure and ingredients set forth at the beginning of Example 1 but using as the polyol component 0.89 equivalent of a blend of 40 parts by weight of the above-described recovered product and 60 parts by weight of the polyol blend (1) used to prepare the original foam in Example 1. The rigid foam so obtained had a poor appearance and much lower compressive strength (7.2 p.s.i. parallel to rise and 6.3 p.s.i. perpendicular to rise) than any of the foams prepared in exactly the same manner from the recovered polyols of Examples 1 to 5.

EXAMPLE 7

This example describes the propoxylation of the recovered polyol of Example 1 to reduce the acid number thereof.

A total of 56 g. of propylene oxide was added dropwise, with stirring, over a period of 4 hours to 475 g. of the polyol having acid number 18 recovered as described in Example 1. The reaction mixture was maintained at 78 to 85° C. throughout the addition. The resulting polyol was allowed to cool to room temperature (25° C.) and found to have a hydroxyl equivalent weight of 104.5 and an acid number of 0.3. Using the procedure described at the end of Example 1, but replacing the recovered polyol of Example 1 by an equivalent amount of the propoxlated polyol described above, there was obtained an excellent rigid polyurethane foam having physical properties comparable to those of the foam used as starting material in Example 1.

EXAMPLE 8

The scrap rigid polyurethane foam used as starting material in the recovery procedure to be described in this example, was derived from a rigid polyurethane foam prepared as follows.

A mixture of 100 parts by weight of a propoxylated sorbitol (LS–490: eq. wt.=116), 3 parts by weight of a solution of triethylenediamine in a dipropylene glycol (DABCO 33LV3, 2 parts by weight of an organosilicone surfactant (L–5420) and 34 parts by weight of trichloroflouromethane was blended mechanically and 121 parts by weight of polymethylene polyphenyl polyisocyanate (eq. wt.=134) was added. The resulting mixture was subjected to high speed agitation for 10 seconds and then allowed to foam. The resulting foam was allowed to cure at room temperature (25° C.) for 7 days.

A charge of 200 g. of finely powdered scrap from the above described rigid foam was recovered using a mixture of 190 g. of diethylene glycol and 10 g. of diethanolamine and operating in accordance with the procedure described in Example 5 above. The recovered polyol had an hydroxyl equivalent weight of 104.5, a viscosity of 7100 cps. at 25° C. and an acid number less than 1.

A rigid polyurethane foam was prepared from the recovered polyol described above using the procedure described at the begining of Example 1 but modifying the polyol component so that it was a blend of:

40 parts by weight of the polyol recovered as described above
25 parts by weight of the blended polyol of eq. wt.=151 described in Example 1
30 parts by weight of the adduct of phosphoric acid and propylene oxide described in Example 1 and
5 parts by weight of trimethylolpropane The resulting rigid polyurethane foam was of excellent appearance and had properties comparable to those of the foam employed as starting material in Example 1.

EXAMPLE 9

The scrap rigid polyurethane foam used as starting material in the recovery procedure to be described in this example was derived from a rigid polyurethane foam prepared as follows:

A mixture of 100 parts by weight of a propoxylated pentaerythritol (PeP–450; eq. wt.=100), 3 parts by weight of a solution of triethylenediamine in dipropylene glycol (DABCO 33LV), 2 parts by weight of an organosilicone surfactant (L–5420) and 37 parts by weight of trichlorofluoromethane was blended mechanically and 141 parts by weight of polymethylene polyphenyl polyisocyanate (eq. wt.=134) was added. The resulting mixture was subjected to high speed agitation for 10 seconds and then allowed to foam. The resulting foam was allowed to cure at room temperature (25° C.) for 7 days.

A charge of 200 g. of finely powdered scrap foam from the above-described rigid foam was recovered using a mixture of 190 g. of diethylene glycol and 10 g. of diethanolamine and operating in accordance with the procedure described in Example 5 above. The recovered polyol had a viscosity of 12,480, an hydroxyl equivalent weight of 103, and an acid number less than 1.

A rigid polyurethane foam was prepared from the recovered polyol described above using the procedure described at the beginning of Example 1 but modifying the polyol component so that it was a blend of:

40 parts by weight of the polyol recovered as described above
25 parts by weight of the blended polyol of eq. wt.=151 described in Example 1
30 parts by weight of the adduct of phosphoric acid and propylene oxide described in Example 1 and
5 parts by weight of trimethylolpropane.

The resulting rigid polyurethane foam was of excellent appearance and had properties comparable to those of the foam employed as starting material in Example 1.

EXAMPLE 10

The scrap rigid polyurethane foam used as starting material in the recovery procedure to be described in this example was derived from a rigid polyurethane foam prepared as follows.

A mixture of 100 parts by weight of a propoxylated methyl glucoside (PG–435: eq. wt.=131), 3 parts by weight of a solution of triethylenediamine in dipropylene glycol (DABCO 33LV), 2 parts by weight of an organosilicone surfactant (L–5420) and 32 parts by weight of trichlorofluoromethane, was blended mechanically and 107 parts by weight of polymethylene polyphenyl polyisocyanate (eq. wt.=134) was added. The resulting mixture was subjected to high speed agitation for 10 seconds and then allowed to foam. The resulting foam was allowed to cure at room temperature (25° C.) for 7 days.

A charge of 200 g. of finely powdered scrap foam from the above-described rigid foam was recovered using a mixture of 190 g. of diethylene glycol and 10 g. of diethanolamine and operating in accordance with the procedure described in Example 5 above. The recovered polyol had a viscosity of 5,650 cps. at 25° C., an hydroxyl equivalent of 99 and an acid number of less than 1.

A rigid polyurethane foam was prepared from the recovered polyol described above using the procedure described at the beginning of Example 1 but modifying the polyol component so that it was a blend of:

40 parts by weight of the polyol recovered as described above
27 parts by weight of the blended polyol of eq. wt.=151 described in Example 1
30 parts by weight of the adduct of phosphoric acid and propylene oxide described in Example 1 and
3 parts by weight of trimethylolpropane.

The resulting rigid polyurethane foam was of excellent appearance and had properties comparable to those of the foam employed as starting material in Example 1.

EXAMPLE 11

The scrap rigid polyurethane foam used as starting material in the recovery procedure to be described in this example was derived from a rigid polyurethane foam prepared as follows.

A mixture of 100 parts by weight of a propoxylated sucrose (RS–450: eq. wt.=127), 3 parts by weight of a solution of triethylene diamine in dipropylene glycol (DABCO 33LV), 2 parts by weight of an organosilicone surfactant (L–5420) and 34 parts by weight of trichlorofluoromethane, was blended mechanically and 111 parts by weight of polymethylene polyphenyl polyisocyanate (eq. wt.=134) was added. The resulting mixture was subjected to high speed agitation for 10 seconds and then allowed to foam. The resulting foam was allowed to cure at room temperature (25° C.) for 7 days.

A charge of 200 g. of finely powdered scrap foam from the above-described rigid foam was recovered using a mixture of 190 g. of diethylene glycol and 10 g. of diethanolamine and operating in accordance with the procedure described in Example 5 above. The recovered polyol had a viscosity of 11,530 cps. at 25° C., an hydroxyl equivalent of 98 and an acid number less than 1.

A rigid polyurethane foam was prepared from the recovered polyol described above using the procedure described at the beginning of Example 1, but modifying the polyol component so that it was a blend of:

40 parts by weight of the polyol recovered as described above
27 parts by weight of the blended polyol of eq. wt.=151 described in Example 1
30 parts by weight of the adduct of phosphoric acid and propylene oxide described in Example 1, and
3 parts by weight of trimethylolpropane The resulting rigid polyurethane foam was of excellent appearance and had properties comparable to those of the foam employed as starting material in Example 1.

EXAMPLE 12

The scrap rigid polyurethane foam used as starting material in the recovery procedure to be described in this example was derived from a rigid polyurethane foam prepared as follows.

A mixture of 100 parts by weight of a polyol of eq. wt.=103 which was the propylene oxide adduct of a Mannich base derived by reaction of nonylphenyl, diethanolamine and formaldehyde, 2 parts by weight of an organosilicone surfactant (L–5420) and 36 parts by weight of trichlorofluoromethane, was blended mechanically and 137 parts by weight of polymethylene polyphenyl polyisocyanate (eq. wt.=134) was added. The resulting mixture was subjected to high speed agitation for 10 seconds and then allowed to foam. The resulting foam was allowed to cure at room temperature (25° C.) for 7 days.

A charge of 200 g. of finely powdered scrap foam from the above-described rigid foam was recovered using a mixture of 190 g. of diethylene glycol and 10 g. of diethanolamine and operating in accordance with the procedure described in Example 5 above. The recovered polyol had a viscosity of 17,950 cps. at 25° C., an hydroxyl equivalent weight of 91 and an acid number less than 1.

A rigid polyurethane foam was prepared from the recovered polyol described above using the procedure described at the beginning of Example 1, but modifying the polyol component so that it was a blend of:

40 parts by weight of the polyol recovered as described above
29 parts by weight of the blended polyol of eq. wt.=151 described in Example 1
30 parts by weight of the adduct of phosphoric acid and propylene oxide described in Example 1; and
5 parts by weight of trimethylolpropane.

The resulting rigid polyurethane foam was of excellent appearance and had properties comparable to those of the foam employed as starting material in Example 1.

EXAMPLE 13

The scrap rigid polyurethane foam used as starting material in the recovery procedure to be described in this example was derived from a rigid polyurethane foam prepared as follows.

A mixture of 100 parts by weight of a polyol of eq. wt.=103 which was the propylene oxide adduct of a Mannich base derived by reaction of nonylphenol, diethanolamine, and formaldehyde, 2 parts by weight of an organosilicone surfactant (L–5420) and 28 parts by weight of trichlorofluoromethane, was blended mechanically and 89 parts by weight of toluene diisocyanate (containing 80 percent by weight of the 2,4-isomer and 20 percent by weight of the 2,6-isomer) was added. The resulting mixture was subjected to high speed agitation for 10 seconds and then allowed to foam. The resulting foam was allowed to cure at room temperature (25° C.) for 7 days.

A charge of 172 g. of finely powdered scrap foam from the above-described rigid foam was recovered using a mixture of 171 g. of diethylene glycol and 9 g. of diethanolamine and operating in accordance with the procedure described in Example 5 above. The recovered polyol had a viscosity of 7,280 cps. at 25° C., an hydroxyl equivalent weight of 88.5 and an acid number less than 1.

EXAMPLE 14

The scrap flexible polyurethane foam used as starting material in the recovery procedure to be described in this example was derived from a flexible polyurethane foam prepared as follows.

A mixture of 100 parts by weight of a polyethr triol of molecular weight 3000 (PG 3030), 0.3 part by weight of stannous octoate, 0.3 part by weight of N-methylmorpholine, 0.3 part by weight of a solution of triethylenediamine in dipropylene glycol, 4 parts by weight of water and 0.7 part by weight of organosilicone surfactant (L–520) was blended mechanically and 47 parts by weight of toluene diisocyanate (containing 80 percent of the 2,4-isomer and 20 percent of the 2,6-isomer) was added. The resulting mixture was subjected to high speed agitation for 10 seconds and then allowed to foam. The resulting foam was allowed to cure at room temperature (25° C.) for 7 days.

A charge of 200 g. of finely powdered scrap from the above flexible foam was recovered using a mixture of 190 g. of diethylene glycol and 10 g. of diethanolamine and operating in accordance with the procedure described in Example 5 above. The resultant polyol consisted of two layers. The upper layer (wt.=156.5 g.) was light in color and had an hydroxyl equivalent of 357, an acid number less than 1, and a viscosity of 721 cps. at 24° C. The lower layer (wt.=220.4 g.) was dark in color and had an hydroxyl equivalent weight of 75.5, an acid number less than 1 and a viscosity of 212 cps. at 25° C.

The two layers were mixed in proportions equivalent to those in their formation using high speed stirring and the resulting mixture (eq. wt.=140) was used as part (40 percent) of the polyol component to prepare a rigid polyurethane foam in accordance with the procedure described at the beginning of Example 1. The resulting rigid foam had properties comparable to those of the corresponding foam described at the beginning of Example 1.

What is claimed is:

1. A process for the recovery of scrap polyurethane foam in the form of a polyol which comprises thermally treating said scrap polyurethane at a temperature of about 175° C. to about 250° C. in the presence of a dihydroxy compound consisting of (i) from 95 percent to 90 percent by weight of an aliphatic diol having from 2 to 6 carbon atoms, inclusive, and having a boiling point above about 180° C. and (ii) from 5 percent to 10 percent by weight of a dialkanolamine having from 4 to 8 carbon atoms, inclusive.

2. The process of claim 1 wherein the dihydroxy compound is a mixture containing about 95 percent by weight of diethylene glycol and about 5 percent by weight of diethanolamine.

3. The process of claim 1 wherein the scrap polyurethane is a rigid cellular polyurethane foam.

4. The process of claim 3 wherein the rigid cellular polyurethane has been prepared from a polymethylene polyphenyl polyisocyanate and a polyol obtained by reaction of propylene oxide with a mixture of polymethylene polyphenyl polyamines derived by acid condensation of aniline and formaldehyde.

5. A process for the recovery of scrap rigid cellular polyurethane in the form of a polyol useful in the preparation of polyurethane, which process comprises the steps of
   (1) heating at a temperature within the range of about 175° C. to about 250° C. a mixture of (a) said scrap polyurethane and (b) a dihydroxy compound consisting of from 100 percent to 90 percent by weight of an aliphatic diol having from 2 to 6 carbon atoms, inclusive, and having a boiling point above about 180° C., and from 0 percent to 10 percent by weight of a dialkanolamine having from 4 to 8 carbon atoms, inclusive, said heating being continued for a time at least sufficient to produce a homogeneous solution; and
   (2) reacting the resulting product with an alkylene oxide selected from the group consisting of ethylene oxide and propylene oxide.

6. The process of claim 5 wherein the scrap rigid cellular polyurethane is one prepared from a polymethylene polyphenyl polyisocyanate and a polyol obtained by reaction of propylene oxide with a mixture of polymethylene polyphenyl polyamines derived by acid condensation of aniline and formaldehyde.

7. The process of claim 5 wherein there is present in the reaction mixture approximately 5 parts by weight of diethanolamine per 95 parts; by weight of diethylene glycol.

8. A process according to claim 5 wherein the scrap foam and the dihydroxy compound are employed in approximately equal parts by weight.

References Cited
UNITED STATES PATENTS

| | | | |
|---|---|---|---|
| 3,632,530 | 1/1972 | Kinoshita | 260—2.3 |
| 3,404,103 | 10/1968 | Matsudaira et al. | 260—2.3 |
| 2,937,151 | 5/1960 | TenBroeck et al. | 260—2.3 |
| 3,300,417 | 1/1967 | McElroy | 260—2.3 |
| 2,917,471 | 12/1959 | Nelson | 260—2.3 |

MURRAY TILLMAN, Primary Examiner

W. J. BRIGGS, SR., Assistant Examiner

U.S. Cl. X.R.

260—2.5 R, 2.5 AT, 32.6 N, 33.4 UR, 77.5 AT, 77.5 A, 77.5 AA